March 23, 1965   F. PETERS   3,174,878
PERMANENTLY SEALED STORAGE BATTERY
Filed Dec. 16, 1958   2 Sheets-Sheet 1

INVENTOR
Freimut Peters
BY Michael S. Striker
ATTORNEY

March 23, 1965 F. PETERS 3,174,878
PERMANENTLY SEALED STORAGE BATTERY
Filed Dec. 16, 1958 2 Sheets-Sheet 2
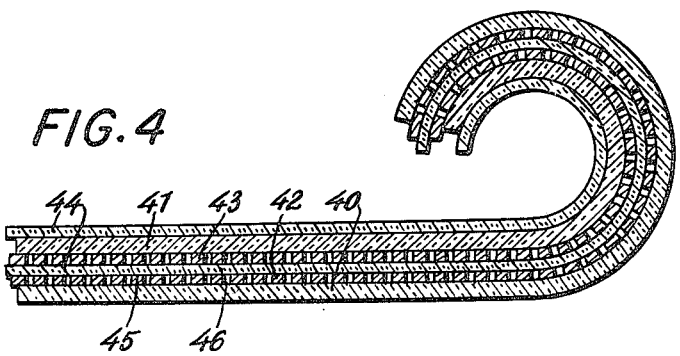
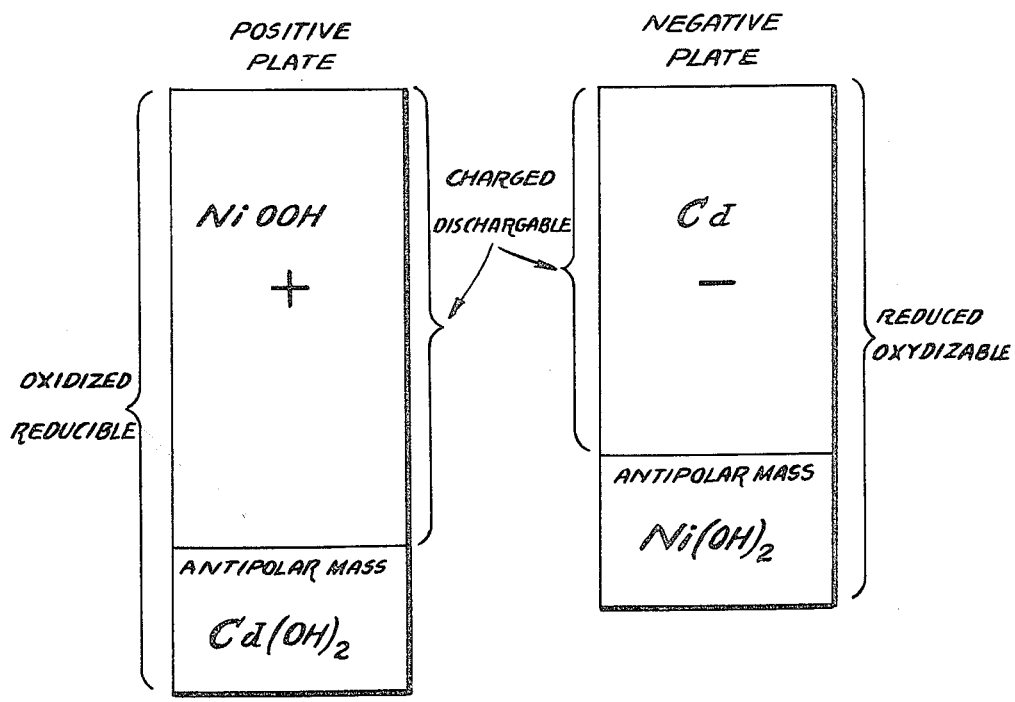
INVENTOR
Freimut Peters
BY
Michael S. Stricker
ATTORNEY

United States Patent Office 3,174,878
Patented Mar. 23, 1965

3,174,878
PERMANENTLY SEALED STORAGE BATTERY
Freimut Peters, Hagen, Westphalia, Germany, assignor to Varta Aktiengesellschaft
Filed Dec. 16, 1958, Ser. No. 780,772
Claims priority, application Germany, Dec. 21, 1957, A 28,539
7 Claims. (Cl. 136—6)

The present invention relates to a permanently sealed storage battery. More particularly, the present invention relates to a permanently, fluid-tight sealed, alkaline storage battery.

Permanently fluid-tight sealed alkaline storage batteries of the type comprising positive and negative electrodes, and a porous separator arranged between the electrodes and contacting the same along a major portion of one face of each of two adjacent electrodes, and in which an alkaline electrolyte is fixed essentially by capillary action in the pores of the electrodes and of the separator, generally require means for disposal of gases generated during operation of the storage battery.

It has been attempted to provide such batteries with negative electrodes having a greater capacity than the positive electrodes and to arrange for a charging condition such that at the time of sealing the battery, the negative electrodes possess a greater quantity of chargeable material than the positive electrodes. In such manner it is possible to prevent hydrogen formation upon supercharging the battery, however, it is not possible to prevent in this manner the formation of an explosive mixture of hydrogen and oxygen gas upon deep-discharge and reversal of polarity of the battery, since under such conditions both electrodes are substantially simultaneously discharged and their polarity reversed.

In order to prevent at least oxygen formation upon deep-discharge of the gas-tight battery, it has been further suggested to provide the negative electrode permanently with a greater ability to discharge electric current than is possessed by the positive electrode. However, batteries formed according to this suggestion will still generate hydrogen in a harmful manner when being subjected to deep-discharge. Such hydrogen is generated on the completely discharged positive electrode upon reversal of its polarity, and normally there are no means available within the battery for binding or otherwise eliminating the thus formed hydrogen gas.

It has also been proposed to add to the positive or negative electrodes of sealed alkaline storage batteries, or to both the positive and negative electrodes, so-called antipolar mass, i.e., active mass of the opposite electrode, for instance, nickel hydroxide to the negative electrode, or cadmium hydroxide to the positive electrode, whereby the addition of antipolar mass to one electrode will strengthen the electrode of opposite polarity. In this manner, gas formation during deep-discharge and temporary reversal of polarity can be repressed but not permanently prevented.

According to another suggestion, the positive electrode of the fluid-tight battery is provided with a greater capacity than the negative electrode, and the positive electrode will also possess a discharge reserve.

However, this last mentioned measure will lead to the formation of oxygen on the negative electrode after the same has been exhausted and its polarity reversed and this will happen before hydrogen is formed on the positive electrode upon completely exhausting its charge. The oxygen will reach the positive electrodes which to the largest part are discharged, and thereby wil be partially bound, thus retarding the formation of hydrogen.

Thus, a further attempt has been made to solve the problem of gas formation in fluid-tight sealed alkaline storage batteries by adding to the positive electrode which possesses a greater capacity than the negative electrode and which possesses a discharge reserve relative to the negative electrode, antipolar mass. To a certain extent one succeeds in this manner to safeguard the fluid-tight battery against reversal of polarity, however, the removal of oxygen gas takes place at too slow a pace for balancing the formation of oxygen gas without experiencing an increase of pressure within the battery. Consequently, an equilibrium between oxygen gas formation and disposal of oxygen gas is reached only at greater oxygen gas pressures even if the area of contact between the oxygen gas and the positive electrodes has been increased by splitting the positive electrodes into partial electrodes formed with an intermediate gas filled slit, or by increasing the area of the rear face of the positive electrode.

It is therefore an object of the present invention to provide a fluid-tight sealed alkaline storage battery which will not be subject to the above discussed operational disadvantages.

It is another object of the present invention to provide a fluid-tight sealed alkaline storage battery in which hydrogen gas formation is reliably prevented under conditions of deep-discharge including reversal of polarity, and in which furthermore the formation of oxygen gas on the negative electrode which will be exhausted prior to exhaustion of the positive electrode, is sufficiently retarded so that even upon prolonged reversal of polarity no harmful over-pressure will be created within the sealed battery.

Other objects and advantages of the present invention will become apparent from a further reading of the description and of the appended claims.

With the above and other objects in view, the present invention mainly comprises in a permanently fluid-tight sealed alkaline storage battery, in combination, at least one positive electrode including active mass, at least one negative electrode, the active mass of said electrode including regular active mass and also including antipolar mass, a porous separator located between and in contact with the electrodes, an alkaline electrolyte at least partially located in the pores of the porous separator, the active mass of the positive electrode including a quantity of reducible material and the active mass of the negative electrode including a quantity of oxidizable material, the quantity of reducible active mass of the positive electrode, in any given condition of charge of the battery, being greater than the quantity of oxidizable active mass of the negative electrode, the quantities of the materials being measured in electro-chemical equivalents, whereby gases formed during operation of the battery will be bound.

According to the present invention, undue gas formation during operation of the fluid-tight sealed alkaline storage battery is prevented by providing that measured in electro-chemical equivalents, the positive electrode will contain at all times a greater quantity of reducible particles of active mass, then the quantity of oxidizable particles of active mass contained in the negative electrode, and that simultaneously the negative electrode is formed with an addition of antipolar mass, preferably nickel hydroxide.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a cross sectional view of a flexible electrode arrangement which may be wound to form a roll suitable for insertion into a cartridge-like, cylindrical housing; and FIG. 5 is a schematic showing of the plates of a charged battery according to a preferred embodiment of the present invention, illustrating their components and the relative capacities thereof.

Figure 1:
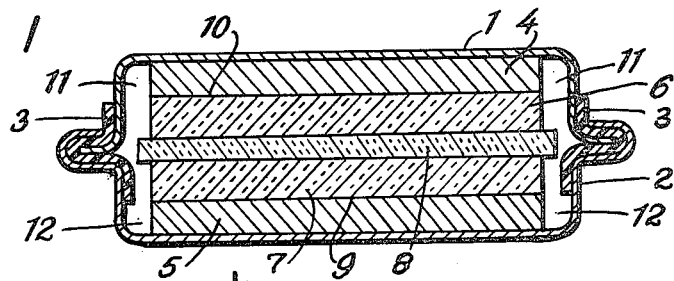
FIG. 1 is a cross sectional view of a button-shaped battery according to the present invention and comprising a single pair of electrodes.

Referring now to the drawings and particularly to FIG. 1, the upper portion 1 and the lower portion 2 of the housing are shown, preferably made of metal. In the areas where housing portions 1 and 2 overlap each other, an insulating intermediate layer 3 is provided, consisting of rubber or of a synthetic material such as a polyamide. The electrode pair 6 and 7 is arranged within the housing and separated by interposed separator 8. Advantageously, electrodes 6 and 7 as well as separator 8 are formed with fine pores. Separator 8 may also consist of a densely woven or otherwise produced fabric, or of a filter paper-like material made of natural or synthetic fibers, or of a semi-permeable foil of regenerated cellulose, of a microporous synthetic membrane or the like, or of a combination of several layers of the above materials. Electrodes 6 and 7 possess large surface areas which are in contact with the gas space within the battery. These areas are indicated in FIG. 1 by reference numerals 9 and 10 denoting opposite faces of electrodes 6 and 7, respectively, which serve for the electro-chemical reaction of the gases. To maintain the electrode faces 9 and 10 spaced from the inner walls of housing portions 1 and 2, spacers 4 and 5 are provided formed as a framework with relatively large open intermediate spaces. It is necessary to maintain the electrodes spaced from the housing in order to provide sufficient contact area between the gases formed during the operation of the battery and the electrodes. Spaces 4 and 5 preferably consist of metal so as to form conductive connections between the respective electrodes and housing portions. At least one of spaces 4 and 5 possesses a certain degree of resiliency. No special connections to the terminals of the battery are needed due to the metallic spaces 4 and 5. The gas space includes in addition to the areas between electrode face 10 and housing portion 1, and electrode face 9 and housing portion 2, also the areas indicated by reference numerals 11 and 12, which, however, are of lesser size and effectiveness than the areas between the electrodes and the housing.

Figure 2:
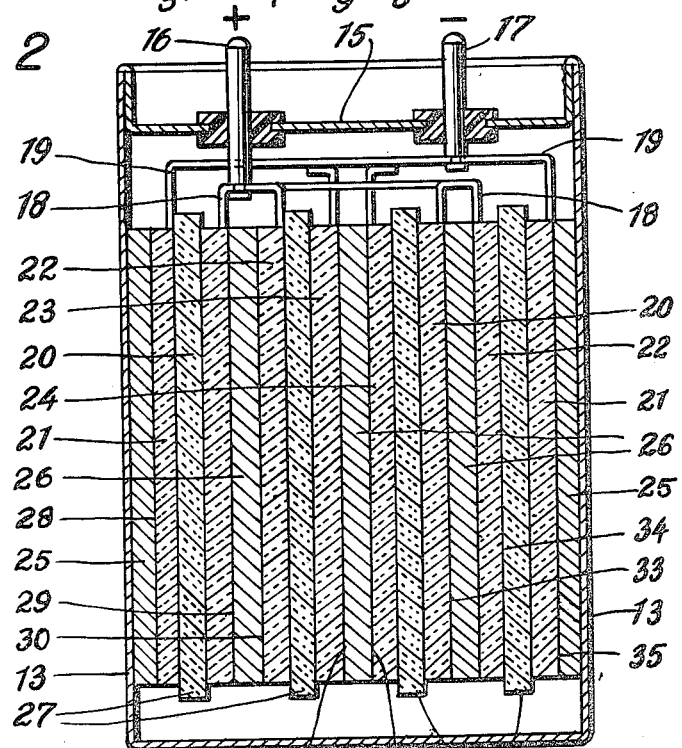
FIG. 2 is an elevational view in cross section of a battery according to the present invention and having a rectangular horizontal cross section.
Figure 3:
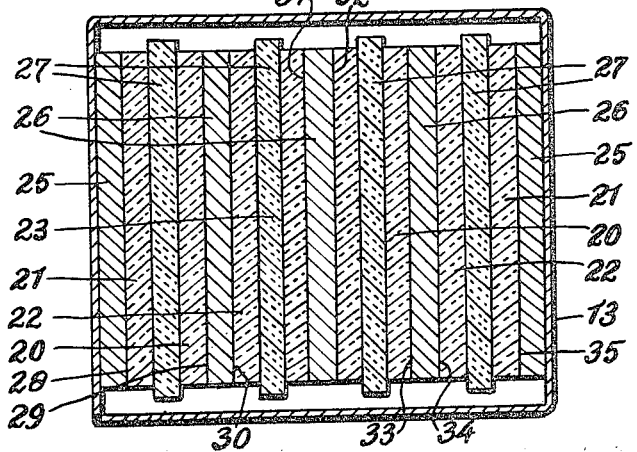
FIG. 3 is a plan view in cross section of the battery illustrated in FIG. 2.

The battery illustrated in FIGS. 2 and 3 is basically constructed in a manner somewhat similar to the battery illustrated in FIG. 1.

Housing 13 is closed by bottom plate 14 and cover member 15. Elements 13, 14 and 15 are preferably made of metal. Terminals 16 and 17 penetrate through cover member 15 and are insulated against the same. Terminals 16 and 17 are in contact with the positive and negative electrodes within the cell by means of electrical conduits 18 and 19. Terminal 16 is thus connected with electrodes 20 and 22, and terminal 17 with electrodes 21, 23 and 24. Electrodes 20 and 22 form electrode pairs, respectively, and similarly electrodes 23 and 24 form pairs, while electrodes 21 outwardly delimit the set of electrode plates. Spacers 26 are located between electrodes 20 and 22, as well as between electrodes 23 and 24. Spacers 25 are provided between the walls of housing 13 and outermost electrodes 21. Spacers 25 and 26 preferably consist of metal and serve for electrically connecting the split positive and negative electrodes, respectively, as well as the housing. Due to the placing of spacers 25 and 26 between electrodes 20 and 22, 23 and 24, and between housing 13 and electrodes 21, a gas accessible area is formed within the battery. Thus, electrode faces 28, 29, 30, 31, 32, 33, 34 and 35 serve for electro-chemically disposing of the gases formed during operation of the battery. These free electrode faces must be covered by a thin film of electrolyte. Between electrodes of opposite polarity such as between electrodes 21 and 20, 22 and 23, 24 and 20, and 20 and 22, separators 27 are arranged.

However, the battery arrangement according to FIGS. 2 and 3 may also be changed in such a manner that for instance, the positive electrode is formed as a single electrode and that consequently the negative electrode in the interior of the set of electrodes is split into two parts while the outer negative electrodes are separated by spacers from the battery housing.

The electrode arrangement according to FIG. 4, is formed in such a manner that the extremely thin electrodes as well as the interposed separators and the metallic net-like spacers having wider openings, are flexible. Consequently, the entire electrode arrangement can be spirally wound into a roll and can be inserted in such shape into a cylindrical housing. In this manner, cylindrical batteries can be formed. The electrode arrangement as illustrated in FIG. 4 comprises an electrode 40, and electrode 41 of a polarity opposite to the polarity of electrode 40. A net-like wide-mesh metallic structure 42 and a similar structure 43, made for instance of lath or wire mesh are placed on the electrodes for the purpose of making one face of each electrode accessible to gas. The faces of the electrodes which will thus come in contact with gas and serve for electro-chemically reacting the same are indicated by reference numerals 45 and 46. The arrangement furthermore includes separators 44.

The quantity of antipolar mass which is added to the negative electrode and which, according to a preferred embodiment of the present invention, is also added to the positive electrode, is preferably so chosen as to amount to between 5 and 30% of the quantity of regular active mass included in the respective electrode, whereby the quantities are measured in electro-chemical equivalents. However, while excellent results have been obtained by keeping the quantity of antipolar mass or masses within the above-described limit, the present invention is not to be considered limited to these percentage figures. Very good results have also been obtained with additions of antipolar mass outside the range of between 5 and 30%, particularly with the addition of larger quantities.

Surprisingly it has been found that in batteries according to the present invention the speed of generation of oxygen at the negative electrode under conditions of deep-discharge and reversal of polarity is sufficiently retarded, notwithstanding the fact that the quantity of antipolar mass included in or added to the negative electrode is relatively small compared with the quantity of regular negative active mass. The considerable retardation of oxygen generation may be explained by the fact that the antipolar mass which, for instance, may consist of nickel hydroxide, is oxidized to higher nickel oxides after exhaustion of the regular negative mass. Due to the retarded generation of oxygen gas, the partial oxygen gas pressure within the fluid-tight sealed battery increases only in the same slow manner as the same increases during charging of the battery. During charging, generation of oxygen gas starts only after the positive electrode is about half charged. Oxygen gas generation then increases so that at the termination of charging, the entire quantity of electric current which is fed to the positive electrode, is spent for generating oxygen gas.

Due to the slowly increasing partial oxygen gas pressure during deep-discharge and reversal of polarity, an equilibrium between oxygen gas generation and oxygen gas consumption is reached only at a considerably later time than would be the case without the addition of antipolar mass to the negative electrode. Consequently, the build-up of harmful overpressure will not occur during the period of time during which the negative electrode possibly may be in a state of reversed polarity.

It follows, that the battery according to the present invention when operated in series, i.e., by combining a plurality of such battery cells, will offer increased security against harmful interior overpressure which otherwise would occur upon reversal of polarity in the battery cell.

Preferably, the positive electrode of the battery according to the present invention comprises in addition to regular active mass such as nickel hydroxide, also an addition of antipolar mass, for instance cadmium mass.

It is the particular advantage of the last mentioned preferred embodiment of the present invention that due to the addition of antipolar mass to the positive electrode, the same will possess, after exhaustion of its regular active mass and after reversal of polarity, a highly negative potential due to the reduction of the antipolar mass. Thereby, upon deep-discharge of a cell of a multiple-cell battery, a strong counter potential is formed which opposes the further flow of the discharge current. Furthermore, due to the presence of the antipolar mass, the positive electrode will possess a potential upon depolarization of the positive electrode which is particularly favorable for consumption of the oxygen gas so that the speed of oxygen gas consumption or removal will be considerably increased, and this favorable potential will be maintained constant upon deep-discharge with reversal of polarity, thus reliably removing oxygen gas during such period of deep-discharge. In this connection, it is important to keep portions of the surface of the positive electrode exposed. Thus, the favorable electrode potential achieved due to the incorporation of antipolar mass in the positive electrode, will facilitate reaching an equilibrium between oxygen generation which is retarded due to inclusion of antipolar mass in the negative electrode, and oxygen consumption which is sped up due to the presence of antipolar mass in the positive electrode. Consequently, the equilibrium between generation and removal of oxygen gas will be reached at a lower degree of overpressure within the battery cell than would be the case without the addition of antipolar mass to the positive electrode. This again results in a further safeguard against the generation of hydrogen gas.

According to a particularly advantageous embodiment of the present invention, the capacity, i.e., the amount, of the reducible regular active mass of the positive electrode is so chosen as to be greater than the amount of the oxidizable regular active mass of the negative electrode, when measured against an auxiliary electrode or in electro-chemical equivalents. In this case, the useful capacity of the battery is limited by the negative electrode and thereby it is achieved that upon the addition of graphite to the positive electrode, the discharge level which is described as the graphite level will no longer be reached as long as the terminal potential is greater than zero volt. The graphite level will thus occur only after reversal of polarity. Discharge of the battery will thus be indicated by a rather sudden drop in voltage between the terminals and this is of great advantage in many technical applications. Furthermore, by thus limiting the useful capacity of the negative electrode and thus of the battery, it will no longer be necessary to include large quantities of antipolar mass in the positive electrode in order to obtain the advantages of having antipolar mass added to the positive electrode. This is important, since the addition of large quantities of antipolar mass to the positive electrode entails increased costs and reduces the effective yield of the regular positive active mass, to the extent to which the latter is mixed with the antipolar mass.

The electrodes for batteries according to the present invention may be similar to all types of electrodes which are known per se for use in alkaline storage batteries, such as electrodes which contain the active mass in perforated pockets, or tubelets of nickel plated steel, electrodes which consist of a porous sintered body formed by sintering of finely powdered metal such as nickel powder, whereby the active mass is introduced into the pores of the sintered body by chemical or electro-chemical means, or also electrodes which are produced by application of pressure to a starting material in powder form which contains the active mass and which may also contain a conductive material.

As customary in the case of fluid-tight sealed storage batteries, the electrolyte is primarily located in the pores of the electrodes and of the separator. The electrolyte is maintained in these pores by capillary action. The separator must consist, of course, of a material which is resistant against the electrolyte.

Preferably, the separators contain pores of sufficient fineness so that when these pores are filled with electrolyte, a barrier against passage of gas bubbles through the separator, from one electrode to the other, is formed.

Furthermore, it is important that in batteries according to the present invention a considerable contact area is provided between the gas space in which oxygen, formed during operation of the battery, accumulates and the electrodes. This large free electrode surface area can be obtained by splitting the negative electrodes and/or the positive electrodes into two partial electrodes which are spaced from each other by suitable spacers, as more fully discussed in connection with the description of the drawings. Oxygen gas present in the battery will penetrate into the slit formed between the partial electrode and will electro-chemically react at the slit-forming electrode faces which are opposite to the working faces of the electrode.

The contact areas between gas and electrode can also be enlarged by freeing the rear face of at least one electrode of one polarity so that gas can contact said rear face which faces away from the adjacent electrode of opposite polarity.

In any event, the free contact portions of the electrodes must be of porous structure and covered with a thin film of electrolyte in order to allow for electro-chemical reaction of the gas and removal of the ions formed thereby.

Finally, it is also possible to superpose upon one or both electrodes (i.e., the electrodes of one or both polarities) a wide-mesh metal structure. This wide-mesh metal structure is superposed upon one face of each of the respective electrodes only, so that access of oxygen gas to such electrodes is assured while only one side of the electrodes participates in the electro-chemical reactions during charging and discharging of the battery.

All of the active masses which customarily are used in positive electrodes, may be used as antipolar masses for the negative electrodes, for instance nickel hydroxide, cobalt hydroxide, copper oxide, etc.

Conversely, all of the active masses which customarily are used in negative electrodes and are known for this purpose, such as active cadmium mass containing cadmium oxide or cadmium hydroxide may be used as antipolar masses for the positive electrodes, provided that these masses can be used in fluid-tight alkaline storage batteries. As stated further above, and without limiting the invention to these figures, the antipolar additions to the positive and negative electrodes will preferably be of the magnitude of between 5 and 30% of the respective regular active masses, measured in electro-chemical equivalents.

The following examples are given as illustrative only of the present invention, the invention however not being limited to the specific details of the examples.

*Example I*

The capacity of the negative electrode is 10 a.h. The capacity of the positive electrode which, according to the present invention, is to possess a discharge reserve, is greater than the capacity of the negative electrode and amounts to 12 a.h. antipolar mass is added to the negative electrode in a quantity which expressed in electro-chemical equivalents amounts to about 3 a.h. The quantity of antipolar mass added to the positive electrode amounts also to about 3 a.h. Thus, the positive electrode has a total discharge capacity of 15 a.h. while the negative electrode has a total discharge capacity of 13 a.h. Thus, in a particularly advantageous manner, the useful capacity is limited by the negative electrode, so that upon discharge of the cell in a multiple cell battery arrangement, the positive electrode will not yet be completely discharged or reduced when the negative electrode including the antipolar mass of the same has been completely exhausted, but to the contrary, the positive electrode will then still possess a discharge capacity of about 2 a.h. in the form of unreduced antipolar mass.

The specific quantitative data given in the above example can of course be varied in both directions, particularly the relationship between antipolar mass and regular active mass.

*Example II*

Thus, the useful capacities of both electrodes may be approximately equal, for instance 10 a.h. and the positive electrode may include a quantity of antipolar mass equal to 5 a.h. while the negative electrode includes antipolar mass equal to between 2 and 3 a.h.

It will be understood that each of the elements described above, or two or more together, may also find a useful application in other types of fluid-tight sealed alkaline storage batteries differing from the types described above.

While the invention has been illustrated and described as embodied in a fluid-tight sealed alkaline storage battery wherein the capacity of the positive electrode is greater than the capacity of the negative electrode and wherein at least the negative electrode includes antipolar mass, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a permanently fluid-tight sealed alkaline storage battery, in combination, at least one positive electrode including regular active mass and also including antipolar mass in a quantity equal to about between 5 and 30% of said regular active mass of said positive electrode measured in electro-chemical equivalents; at least one negative electrode including regular active mass and also including antipolar mass; a porous separator located between and in contact with said electrodes; an alkaline electrolyte at least partially located in the pores of said porous separator, said active mass of said positive electrode which comprises regular active mass and antipolar mass, including a quantity of reducible material and said active mass of said negative electrode which comprises regular active mass and antipolar mass, including a quantity of oxidizable, material, said quantity of reducible material of the positive electrode, in any give condition of charge of said battery, being greater than the quantity of oxidizable material of the negative electrode, said quantities of said materials being measured in electro-chemical equivalents, whereby gases formed during operation of said battery will be bound.

2. In a permanently fluid-tight sealed alkaline storage battery, in combination, at least one positive electrode including nickel hydroxide as regular active mass and also including active cadmium mass as antipolar mass; at least one negative electrode including regular active mass and also including antipolar mass; a porous separator located between and in contact with said electrodes; an alkaline electrolyte at least partially located in the pores of said porous separator, said active mass of said positive electrode containing regular active mass and antipolar mass, including a quantity of reducible material and said active mass of said negative electrode containing regular active mass and antipolar mass, including a quantity of oxidizable, material, said quantity of reducible material of the positive electrode, in any given condition of charge of said battery, being greater than the quantity of oxidizable material of the negative electrode, said quantities of said materials being measured in electro-chemical equivalents, whereby gases formed during operation of said battery will be bound.

3. In a permanently fluid-tight sealed alkaline storage battery, in combination, at least one positive electrode including regular active mass and also including antipolar mass; at least one negative electrode including regular active mass and also including antipolar mass; a porous separator located between and in contact with said electrodes; an alkaline electrolyte at least partially located in the pores of said porous separator, said active mass of said positive electrode containing regular active mass and antipolar mass, including a quantity of reducible material and said active mass of said negative electrode containing regular active mass and antipolar mass, including a quantity of oxidizable, material, said quantity of reducible material of the positive electrode, in any given condition of charge of said battery, being greater than the quantity of oxidizable material of the negative electrode, said quantities of said material being measured in electro-chemical equivalents, whereby gases formed during operation of said battery will be bound.

4. In a permanently fluid-tight sealed alkaline storage battery, in combination, at least one positive electrode including active mass; at least one negative electrode including active mass and also including antipolar mass, the capacity of active mass of said positive electrode measured against an auxiliary electrode being greater than the capacity of said active mass of said negative electrode; a porous separator located between and in contact with said electrodes; an alkaline electrolyte at least partially located in the pores of said porous separator, said active mass of said positive electrode including a quantity of reducible material and said active mass of said negative electrode including a quantity of oxidizable material, said quantity of reducible material of the positive electrode, in any given condition of charge of said battery, being greater than the quantity of oxidizable dischargeable material of the negative electrode, said quantities of said materials being measured in electro-chemical equivalents, whereby gases formed during operation of said battery will be bound.

5. In a permanently fluid-tight sealed alkaline storage battery, in combination, at least one positive electrode including regular active mass and also including antipolar mass; at least one negative electrode including regular active mass and also including antipolar mass; a porous separator located between and in contact with said electrodes; an alkaline electrolyte at least partially located in the pores of said porous separator, said positive electrode including in its regular active mass a quantity of reducible material which measured in ampere hours is greater than the quantity of oxidizable material of the regular active mass of said negative electrode, and both electrodes including antipolar masses in such quantities, respectively, that the sum of the reducible materials of the regular active mass of the antipolar mass of the positive electrode, measured in ampere hours, is greater than the sum of the oxidizable materials of the regular active mass and antipolar mass of the negative electrode, whereby oxygen gas formed at the positively poled electrode will be consumed at the negatively poled electrode so as to prevent hydrogen gas formation at the latter.

6. In a permanently fluid-tight sealed alkaline storage battery, in combination, at least one positive electrode including regular active mass and also including antipolar mass; at least one negative electrode including regular active mass and also including antipolar mass; a porous separator located between and in contact with said electrodes; an alkaline electrolyte at least partially located in the pores of said porous separator, said positive electrode including in its regular active mass a quantity of reducible material which measured in ampere hours is greater than the quantity of oxidizable material of the regular active mass of said negative electrode, and both electrodes including antipolar masses in such quantities, respectively, that the sum of the reducible materials of the regular active mass and antipolar mass of the positive electrode, measured in ampere hours, is greater than the sum of the oxidizable materials of the regular active mass and antipolar mass of the negative electrode and that the sum of the oxidizable materials of the regular active mass and antipolar mass of the negative electrode is greater than the amount of oxidizable material of the regular active mass of the positive electrode also measured in ampere hours, whereby gases formed during operation of said battery will be bound.

7. In a permanently fluid-tight sealed alkaline storage battery, in combination, at least one positive electrode including regular active nickel hydroxide mass and also including anti-polar cadmium mass in a quantity equal to about between 5 and 30% of said active nickel hydroxide mass of said positive electrode measured in electro-chemical equivalents; at least one negative electrode including regular active cadmium mass and also including anti-polar nickel hydroxide mass in a quantity equal to about between 5 and 30% of said active cadmium mass of said negative electrode measured in electro-chemical equivalents; a porous separator located between and in contact with said electrodes; an alkaline electrolyte at least partially located in the pores of said porous separator, said regular active mass of said positive electrode including a quantity of reducible material and said regular active mass of said negative electrode including a quantity of oxidizable material, said quantity of reducible material of the positive electrode, in any given condition of charge of said battery, being greater than the quantity of oxidizable material of the negative electrode, said quantities of said materials being measured in electrochemical equivalents, whereby gases formed during operation of said battery will be bound.

References Cited in the file of this patent

UNITED STATES PATENTS 1,373,733    Hubbell _____ Apr. 5, 1921

FOREIGN PATENTS 165,982    Australia _____ Jan. 29, 1953
782,394    Great Britain _____ Sept. 4, 1957